E. M. HEYLMAN.
HARROW.
APPLICATION FILED JAN. 22, 1910.

1,008,147.

Patented Nov. 7, 1911.
2 SHEETS—SHEET 1.

E. M. HEYLMAN.
HARROW.
APPLICATION FILED JAN. 22, 1910.
1,008,147.
Patented Nov. 7, 1911.
2 SHEETS—SHEET 2.
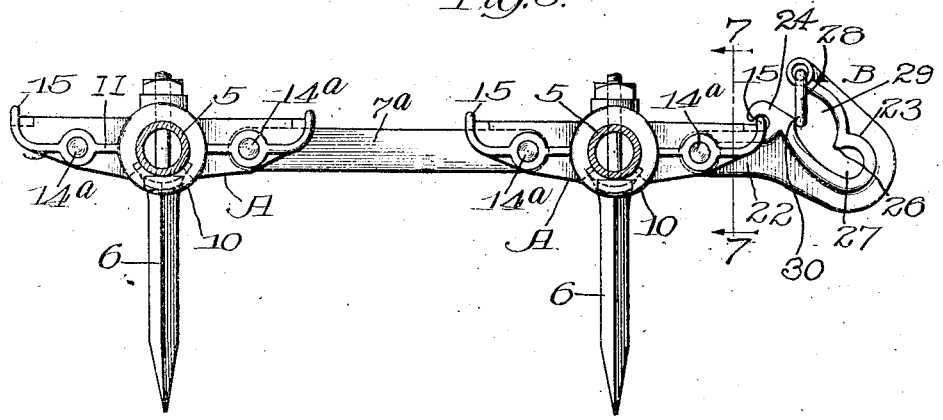
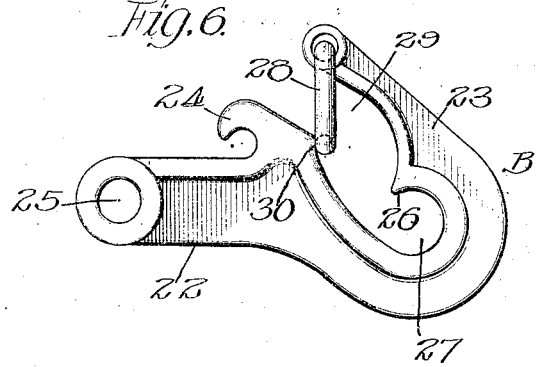
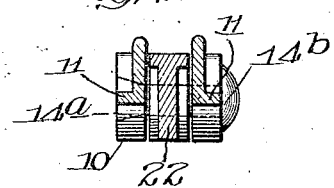
Witnesses:
Inventor:
Edward M Heylman

UNITED STATES PATENT OFFICE.

EDWARD M. HEYLMAN, OF ROCK ISLAND, ILLINOIS, ASSIGNOR TO ROCK ISLAND PLOW COMPANY, OF ROCK ISLAND, ILLINOIS, A CORPORATION OF ILLINOIS.

HARROW.

1,008,147.   Specification of Letters Patent.   Patented Nov. 7, 1911.

Application filed January 22, 1910. Serial No. 539,520.

*To all whom it may concern:*

Be it known that I, EDWARD M. HEYLMAN, a citizen of the United States of America, and resident of Rock Island, Illinois, have invented a certain new and useful Improvement in Harrows, of which the following is a specification.

My invention relates to improvements in harrows, and has for its object the production of a device of great flexibility, and one that can be readily and quickly assembled and disassembled.

A further object contemplates the use of improved forms of castings of unique design in combination with an improved form of draft hook provided with a drop link, forming an implement of great flexibility, and at the same time avoiding all danger of the parts becoming disassembled while the harrow is in use.

A further object is the production of a simple, cheap and effective implement, and one that is not liable to get out of order.

These and such other objects as may hereinafter appear are attained by my device, an embodiment of which is illustrated in the accompanying drawings, in which—

Figure 1:
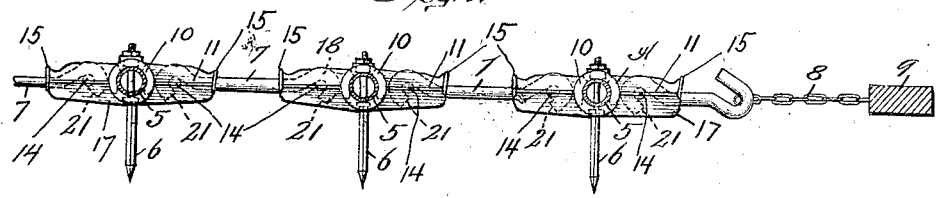
Figure 2:
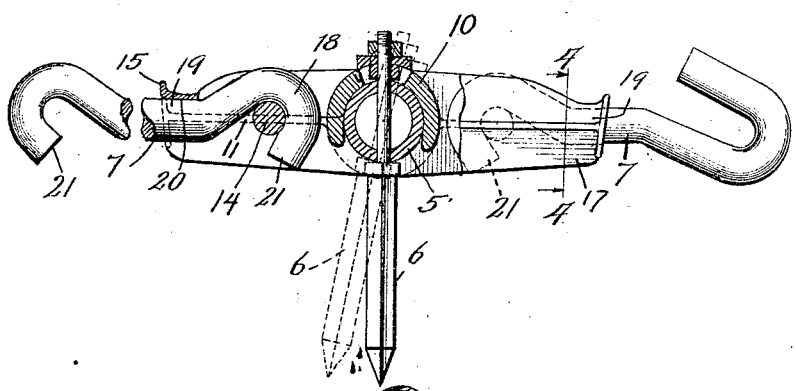
Figure 3:
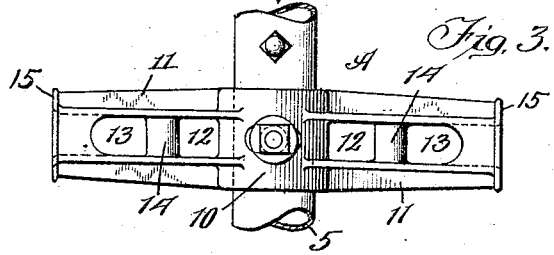
Figure 4:
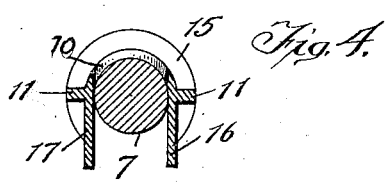

Figure 1 represents a side elevation of a portion of a harrow containing my improvements. Fig. 2 represents an enlarged view of a single bar and connections partly in section. Fig. 3 represents a top plan view of Fig. 2 with the links removed. Fig. 4 represents a sectional view on the line 4—4 of Fig. 2, looking in the direction indicated by the arrows. Fig. 5 represents a side elevation of a portion of a harrow showing a modification of my device. Fig. 6 represents an enlarged view of the draft hook shown in Fig. 5. Fig. 7 represents a sectional view on line 7—7 of Fig. 5, looking in the direction indicated by the arrows.

Like numerals of reference indicate like parts in the several figures of the drawings.

Referring now to the drawings: 5—5 represent harrow bars of the ordinary steel-pipe variety each provided with the usual number of teeth, one of which, on each bar, is shown at 6—6. Near the ends of each bar are mounted connecting castings A. The bars are connected together by means of links 7—7, and the forward bars are connected by chains 8 to the draw-bar 9, to form a completed implement. The connecting casting A comprises a central body portion 10 having a central bore adapted to receive the pipe bar 5 and integral projecting wings 11. The wings are provided with openings 12—13 on each side of a cylindrical support 14 extending between the sides of the wings. At the end, the wings are provided with a stiffening flange 15, and the sides of the wings are turned downwardly, forming parallel members 16—17, as clearly shown in Fig. 4. The connecting links 7 are formed with hooked ends 18, adapted to pass through the openings 12—13 and fit over the support 14. It will be noted that the hook 18 is of such a shape that the straight portion of the link at 19 fits against the inner face 20 of the flange 15, and when the bars and members are assembled the connecting castings and links are in substantially the same horizontal plane as shown in Fig. 1. It will be noted that the links are not free to move sidewise, thus insuring a flexibility of structure as regards vertical movement, with a proper rigidity as regards lateral movement. While the link has a vertical movement, it is limited by the flange 15, thus making it absolutely impossible for the hook 18 to be disengaged from the support 14 without swinging it clear around until the end 21 occupies a position on a level with the upper surface of the casting, out of the opening 12 and above the opening 13. This is a position that the several parts can never assume during the operation of the harrow, and can only be done by hand when it is desired to disassemble the parts.

It will thus be seen that by the use of my improved castings and link connections, a harrow can be assembled that will not only possess the required flexibility, but also one in which it is practically impossible to have the parts become disconnected.

By the use of my improvement, a harrow can be formed with any desired number of bars by simply disconnecting or adding bars and links. This is a very valuable feature, as it is often desired, in certain kinds of soil and at certain seasons of the year, to use different harrows; and in the event that a proper pulverization of the soil may be obtained with three or four bars it is unnecessary to drag five or six bars over the field, while if more bars are needed they can be added as desired, thus making a single harrow with a few extra bars serve all the desired purposes of two harrows, and at a greatly reduced cost.

In Figs. 5, 6 and 7, I have illustrated a modified form of my device, in which, in place of the hooked link members 7, I substitute a straight bar or link 7ª. The members being held in position within the castings A by means of pins 14ª passing through the casting and link, a pivotal connection is formed, the same as in the other form. The pin 14ª may be held in place in any desired manner; for instance, it may be provided with a head 14ᵇ, and its opposite end be slightly upset. This pin may be readily driven out if it is desired to remove any of the sections. In this form a free vertical motion of the individual tooth bars may be attained by extending the openings 13 to the end of the castings.

The draft hook B is provided with a substantially straight shank 22 with an upwardly curved hook end 23. A hooked lug 24 projects upwardly and rearwardly from the body of the hook and engages the flange 15 on the casting A, holding the same securely and rigidly in place. The shank is provided with an opening 25 through which a bolt passes similar to that holding the links in position. The hooked end 23 is provided with an inwardly extending projection or lug 26, forming a pocket 27 within which the hitch is made, as shown in Fig. 5. The hitch being low in hook tends to keep the front bar of the harrow up so the teeth will be held at the same angle as the other parts. At the end of the hook 23 is hung a link 28 falling down and blocking the throat 29 of the hook. The end of the link normally strikes against the shoulder 30, securely locking the hook in place and preventing the unhooking of the implement in turning.

By the use of the straight link 7ª, unnecessary blacksmith work is avoided, and an efficient device is obtained at a comparatively small cost.

While I have illustrated and described two forms of casting by means of which the desired results contemplated by my invention may be accomplished, it is evident that other forms may be used without departing from the spirit of my invention. Furthermore, while I have shown the particular construction of a draft hook having a drop-link such as shown in Fig. 5, in combination with a modified form of flexible link connections for the harrow bars, it is to be understood that this link can be equally as well employed in combination with the flexible connections illustrated in Figs. 1 to 4.

I claim:

1. In a harrow, the combination with a plurality of bars, flexible connections uniting said bars, comprising castings mounted on said bars and links connecting said castings, said castings comprising a main portion adapted to fit over said bars, extended ends provided with a pair of openings in their upper faces, and a link support between said openings.

2. In a harrow, the combination with a plurality of bars, flexible connections uniting said bars, comprising castings mounted on said bars and links connecting said castings, said castings comprising a main portion adapted to fit over said bars, extended ends provided with a pair of openings in their upper faces, and a link support between said openings, and means for preventing said links from working out of engagement with said castings.

3. In a harrow, the combination with a plurality of bars, flexible connections uniting said bars, comprising castings mounted on said bars and links connecting said castings, said castings comprising a main portion adapted to fit over said bars, extended ends provided with a pair of openings in their upper faces, and a link support between said openings, each of said extended ends terminating in a vertical channel through which said links pass.

Signed by me at Rock Island, Ill., this 15th day of January 1910.

EDWARD M. HEYLMAN.

Witnesses:
F. W. DE LONG,
LUCIA TULLER.